United States Patent [19]
Humbs et al.

[11] Patent Number: 4,855,764
[45] Date of Patent: Aug. 8, 1989

[54] APPARATUS FOR SEALING AND CLEANING THE INK DISCHARGE OPENINGS AT AN INK PRINTING HEAD

[75] Inventors: Rolf Humbs, Munich; Ingolf Depta, Petershausen, both of Fed. Rep. of Germany

[73] Assignee: Siemens Aktiengesellschaft, Berlin and Munich, Fed. Rep. of Germany

[21] Appl. No.: 138,090

[22] PCT Filed: Feb. 20, 1987

[86] PCT No.: PCT/DE87/00057

§ 371 Date: Oct. 13, 1987

§ 102(e) Date: Oct. 13, 1987

[87] PCT Pub. No.: WO87/04979

PCT Pub. Date: Aug. 27, 1987

[30] Foreign Application Priority Data

Feb. 25, 1986 [DE] Fed. Rep. of Germany ....... 3606031

[51] Int. Cl.[4] ............................................ G01D 15/18
[52] U.S. Cl. ................................................ 346/140 R
[58] Field of Search ................................ 346/140, 1.1

[56] References Cited

U.S. PATENT DOCUMENTS

| | | | |
|---|---|---|---|
| 4,045,802 | 8/1977 | Fukazawa | 346/140 |
| 4,223,322 | 9/1980 | Van Raamsdonk | 346/140 |
| 4,241,357 | 12/1980 | Anestos | 346/140 |
| 4,253,103 | 2/1981 | Heinzl et al. . | |
| 4,300,145 | 11/1981 | Raamsdonk | 346/140 |
| 4,317,124 | 2/1982 | Shirato et al. . | |
| 4,367,479 | 1/1983 | Bower | 346/140 |
| 4,371,881 | 2/1983 | Bork | 346/140 |
| 4,479,136 | 10/1984 | Lewis . | |
| 4,500,894 | 2/1985 | Kirner | 346/140 |

FOREIGN PATENT DOCUMENTS

| | | |
|---|---|---|
| 3113816 | 2/1982 | Fed. Rep. of Germany . |
| 3508561 | 12/1985 | Fed. Rep. of Germany . |
| 59-45163 | 3/1984 | Japan . |

OTHER PUBLICATIONS

Japanese Abstract from vol. 6, No. 163 of Aug. 26, 1982, "Apparatus for Cleaning Nozzle of Ink Jet Printer".
IBM Technical Disclosure Bulletin, vol. 19, No. 10, Mar. 1977, pp. 3703 and 3704.
IBM Technical Disclosure, vol. 19, No. 1, Jun. 1976, p. 289.

*Primary Examiner*—Joseph W. Hartary
*Attorney, Agent, or Firm*—Hill, Van Santen, Steadman & Simpson

[57] ABSTRACT

An ink printing head of an ink printing means has a cover element and a stripper element allocated to it. The cover element and the stripper element are seated in front of the ink printing head in displaceable fashion such that, in a first operating condition, only the cover element covers the ink discharge openings in a distance forming a gap, whereby the gap is then filled with writing fluid via the ink discharge openings. In a second operating condition, the stripper element wipes across the ink discharge opening and thereby eliminates the ink in the gap. Cover element and stripper element are connected to one another and are actuated by an electromotive means.

4 Claims, 1 Drawing Sheet

APPARATUS FOR SEALING AND CLEANING THE INK DISCHARGE OPENINGS AT AN INK PRINTING HEAD

BACKGROUND OF THE INVENTION

1. Field of the Invention

The invention is directed to an apparatus for sealing and cleaning ink discharge openings.

2. Description of the Prior Art

German application 32 07 072 corresponds to U.S. Pat. No. 4,500,894. German patent 26 10 518 corresponds to U.S. Pat. No. 4,253,103 and German application 30 05 394 corresponds to U.S. Pat. No. 4,317,124. See also U.S. Pat. No. 4,300,145; U.S. Pat. No. 4,479,136, Patent Abstracts of Japan Vol. 6, No. 163 (M-152) (1041) Aug. 26, 1982 JP 5780064 (Sharp K.K.) May 19, 1982, IBM Technical Disclosure Bulletin, Vol. 19, No. 1, June 1976 (Armonk), R. J. Surty et al "Ink Jet Shutter and Flushing Mechanism" Page 289, German 3113816 (Siemens) October 1982 and IBM Technical Disclosure Bulletin, Vol. 10, No. 10 March 1977 (Armonk) J. Mako et al, "Cleaning Ink Jet Nozzles" pages 3703–3704.

SUMMARY OF THE INVENTION

For reliable operation of an ink printing means functioning in accord with what is referred to as the under-pressure method wherein the ink pressure in the ink head is either zero or below, it is critical that the ink channels always be completely filled with ink. Contaminants and air bubbles or gas bubbles in the channel and/or in the nozzle region lead to considerable trouble in the function of the ink head and are quite commonly the reason for the complete outage thereof. This malfunction can be eliminated with a rinsing procedure wherein ink is pressed through the channel and nozzle region with a chronologically limited over-pressure.

A rinsing apparatus is already disclosed (German patent 26 10 518) wherein an over-pressure is briefly manually generated by actuation of a plunger in the write head. The desired, negative ink meniscus is again formed in every nozzle opening when the static under-pressure is restored. The quantity of ink used by the rinsing procedure, however, can fluctuate within broad limits and can lead to considerable losses and, respectively, supply problems.

German published application 32 07 072 discloses a covering and cleaning apparatus for ink printing heads in order to clean the ink printing head and to cover it between the printing events. It is composed of a sealing plate pivotably arranged in front of the nozzle plate, this sealing plate comprising a cut-out with sharp edges in the region of the discharge openings of the nozzle plate and being held by a clamp clip supplying the contact for the sealing plate and the nozzle plate. A crank mechanism is provided for the drive of the sealing plate, the crank pin thereof engaging into a slot of the sealing plate and being movable back and forth between two detents. The stripper element can thereby be composed of plastic.

Such an apparatus has the disadvantages that dried particles of an ink-dust mixture can make the cleaning of the ink discharge openings more difficult, this also applying to the sealing thereof in the quiescent condition.

German published application 35 08 561 discloses a combined covering and cleaning apparatus for an ink printing head which is composed of a movable slide pressing against the exit region of the ink head under motor drive. The slide comprises a passage as well as channels for the acceptance of rinsing ink. In a first operating condition, the passage lies in front of the discharge nozzles and releases these. In a rinsing condition, the slide is successively conducted over the discharge nozzle and the latter is rinsed, whereby the channels of the slide divert the rinsing ink.

German published application 30 05 394 also discloses that the exit regions of the printing nozzles be sealed via a gap filled with ink.

An object of the invention is to fashion a method and an apparatus of the species initially cited such that, without great outlay, a sealing of the ink discharge openings is possible on the one hand and, on the other hand, so is a residue-free cleaning thereof.

In that the ink discharge openings at the ink printing head are covered by a liquid-filled gap, a tight and reliable sealing of the ink discharge openings in the closed condition is first achieved; on the other hand, no dried residues can form since the writing fluid itself re-dissolves these potentially dried particles.

The only thing required for filling the ink gap is, for example, to bring the ink head into a parking position and to then fill this gap by renewed actuation of the ink printing nozzles.

In terms of its width and its distance from the printing head, the gap can thereby be dimensioned such that the capillary action occurs, so that the writing fluid holds itself in the gap.

In an advantageous embodiment of the invention, the stripping element used for removing the writing fluid from the gap is employed to cover the ink discharge nozzles.

The cover element and the stripper element can thereby be allocated to the print head and can be actuated by a motor drive arranged on the print head or, on the other hand, a cover and stripper element is arranged outside of the platen in a parking position of the print head and is actuated by a separate actuation.

In a further, advantageous embodiment of the invention, the cover and stripper element comprises a cover pillow that is composed of a fine-mesh fabric having a capillary effect. For sealing, the pillow is brought in front of the ink discharge openings where it is saturated with ink from the ink discharge openings by capillary action and thus closes the discharge openings via a fluid film.

The cover pillow itself can thereby act as stripper element. An additional, mechanical gap formation and separate filling of the gap with ink on the basis of elevated pressure in the ink system can be eliminated.

The invention is usable for all ink printing heads operating on the under-pressure principle, whether with ink printer heads comprising piezo-electric drive or ink printer heads comprising electro-thermal transducers.

An embodiment of the invention is shown in the drawings and shall be set forth in greater detail below by way of example. Shown are:

DESCRIPTION OF THE PREFERRED EMBODIMENTS

Figure 1:
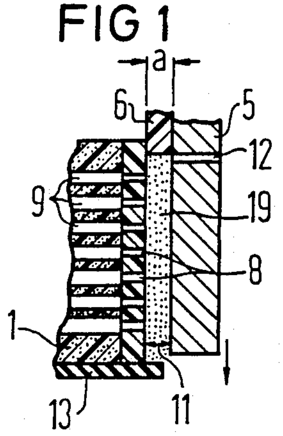
FIG. 1, a schematic illustration of the ink exit region of an ink printing head wherein the ink discharge openings are covered by writing fluid.

An ink printing head 1 not shown in detail here which can contain both piezo-tranducers as well as electrothermal transducers is seated on a printer carriage 2 of an ink printing device, being motor-displaceable along guide rails 3. A replaceable ink reservoir 4 is also arranged on the printer carriage 2, namely somewhat under the ink printing head 1 in order to thereby generate a certain, static under-pressure in the ink printing head 1.

An apparatus for sealing and cleaning the ink discharge openings is associated with the ink printing head 1, this apparatus being composed of a cover element 5 and of an allocated stripper element 6. Together with the cover element, the stripper element can be moved over the ink discharge openings of the printing head via an electromotive means 7.

Figure 3:
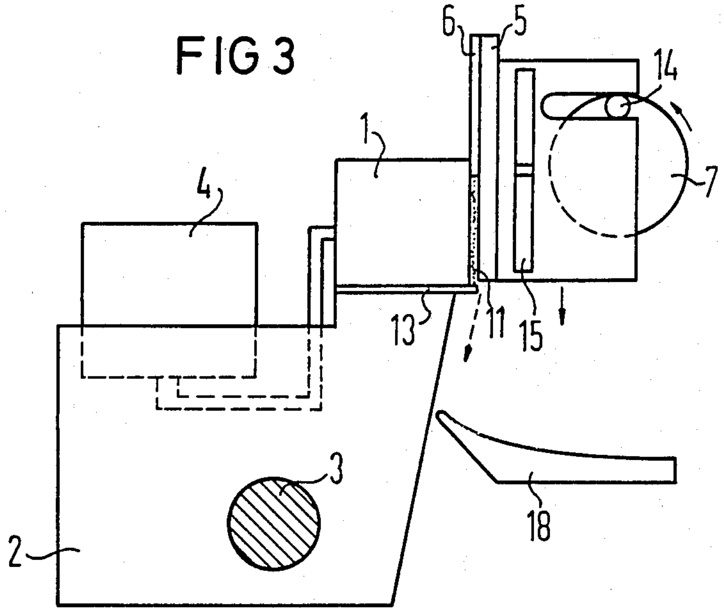
FIG. 3, a schematic, sectional view of the ink printing head on a carriage and the appertaining apparatus which actuates the sealing and cleaning mechanism.

In a first operating condition shown in FIG. 1 wherein, in accord with FIG. 3, the ink printing head together with the printer carriage 2 have been moved to a lateral parking position next to the platen (not shown here), the stripper element 6 is located a small distance a in front of the ink discharge openings 8 of the ink printing head 1 which are connected to ink supply channels 9. The cover element 5 thereby covers the entire exit region of the ink discharge openings 8. There is a distance a from the ink discharge openings 8 which is equal to the width of a stripper element 6 which is formed of elastic material. The cover element 5 is spaced so as to form a gap 11 between it and a nozzle plate 10 which fluidly communicates with the ink discharge openings 8. An aeration channel 12 is also arranged in the upper part of the cover element 5. A sealing lip 13 covers the gap 11 at the bottom.

The apparatus functions as follows. After the ink printing head has been moved to the parking position shown in FIG. 3, the nozzle plate 10 will be a distance a in front of the cover element 5. The ink printing head is activated via a central printer control means, so as to actuate all of the transducer elements in the printing head, whereby the gap 11 is filled with ink 19. Due to the narrow gap in combination with the sealing lip 13, no ink can emerge from the gap 11. The writing fluid provides the corresponding seal of the ink discharge openings 8. The aeration channel 12 facilitates the filling of the gap 11. Since only a very small region of the ink or, respectfully, of the gap 11 which is filled with ink is exposed to the air, practically no drying of the ink will occur in the region of the gap. This is also true even during long periods when the printer is not operated.

Before the printer is placed in operation, the cover and stripper element 5 which is guided in a guide 15 is moved down as shown by the arrow by the electromotive means 7 which, being drives a pin 14. The stripper element 6 which can be composed of an elastic material then brushes over the ink discharge openings and wipes off the ink in the gap 11. The sealing lip 13 which, for example, can be composed of an elastic plastic removes the ink from the stripper element 6. A force thus acts on the stripper element during stripping.

Figure 2:
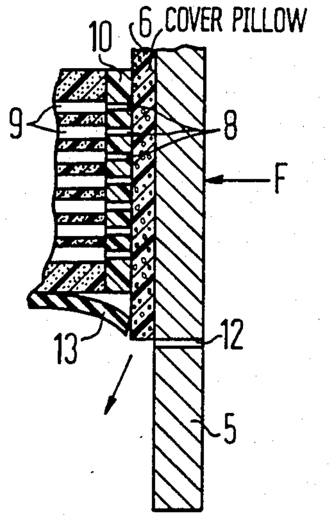
FIG. 2, a schematic, sectional view of the same ink printing head during the cleaning event.

When the head is not operated for an extremely long period it is also possible to have the cover element 6 instead of the ink film to be in front of the ink discharge openings in accord with the illustration of FIG. 2 so that stripper element covers the ink discharge openings. It is only necessary before re-assuming printing to repeat the above-described cleaning cycle.

The ink 19 displaced out of the gap 11 during stripping is wiped off by the sealing lip 13 and is collected by a corresponding residual ink collecting means 18.

Instead of the actuation mechanism shown in FIG. 3, it is also possible to move the stripper and cover element with a mechanism corresponding to that shown in German published application 32 07 072 which is associated with to the ink printing head. Wiping across the ink discharge opening can occur both horizontally as well as vertically.

In an embodiment of the invention which roughly has the same structure shown in FIGS. 1 and 2, the stripper element 5 has a wall thickness which is composed of a filter fabric or, respectfully, of a stainless steel fabric having a thickness of, for example, 0.1 through 0.2 mm and a mesh size of 30 um. For sealing the ink discharge openings 8, the cover element 6 formed as a cover pillow is pushed in front of the ink discharge openings, where the pillow sucks ink 19 out of the ink discharge openings due to capillary action. A moisture film which effects the actual sealing is formed in front of the ink discharge openings. A mechanical gap form with the cover element 5 is eliminated, since the so-called stripper element 6 itself acts as a cover element (sealing pillow). The cover element 5 is supported against the ink discharge opening 8 with the cover pillow. An additional gap formation with the cover element 5 is no longer needed.

We claim:

1. Apparatus for sealing and cleaning ink discharge openings of an ink printing head (1) of an ink printing means comprising a cover and stripper element (6, 5) mounted adjacent the ink printing head (8) and displaceably seated relative to each other such that in a first operating condition, only the cover element (5) covers the discharge openings (8) at a distance which forms a gap (11), said gap (11) is filled with writing fluid (19) by way of the ink discharge openings (8); and said ink discharge openings (8) can be wiped by said stripper element (6) during a second operating condition so as to remove the writing fluid (19) located in the gap (11), wherein said stripper element (6) and said cover element (5) are arranged adjacent each other and the cover element (5) extends over the discharge openings 8 which are to be sealed and to be stripped after a gap formation (11), wherein in said cover and stripper elements (5, 6) comprise a cover pillow of porous material that can be moved in front of the discharge openings (8) for sealing and which preferably absorbs writing fluid (19) through the discharge openings (8) due to capillary action and seals the discharge openings (8) with a fluid film, wherein said elements (5, 6) are connected to each other and can be actuated with a shared, electromotive actuation means (7), including a stripper and sealing lip (13) of elastic material which projects over the ink discharge surface and is mounted on the ink printing head (1), and wherein said cover element (5) comprises an aeration channel (12).

2. Apparatus for sealing and cleaning ink discharge openings of an ink printing head (1) of an ink printing means comprising a cover and stripper element mounted adjacent the ink printing head (8) and displaceably seated relative to each other such that in a first operating condition, only the cover element (5) covers the discharge openings (8) at a distance which forms a gap (11), said gap (11) is filled with writing fluid (19) by way of the ink discharge openings (8); and said ink discharge openings (8) can be wiped by said stripper element (6) during a second operating condition so as to remove the writing fluid (19) located in the gap (11), wherein said stripper element (6) and said cover element (5) are arranged adjacent each other and the cover element (5) extends over the discharge openings 8 which are to be sealed and to be stripped after a gap formation (11), and wherein in said cover and stripper elements (5, 6) comprise a cover pillow of porous material that can be moved in front of the discharge openings (8) for sealing and which preferably absorbs writing fluid (19) through the discharge openings (8) due to capillary action and seals the discharge openings (8) with a fluid film.

3. Apparatus according to claim 2, wherein said cover pillow is composed of a tightly meshed filter or gauze.

4. Apparatus according to claim 2 wherein said elements (5, 6) are connected to each other and can be actuated with a shared, electromotive actuation means (7).

* * * * *